US011769235B2

(12) United States Patent
Tao et al.

(10) Patent No.: US 11,769,235 B2
(45) Date of Patent: *Sep. 26, 2023

(54) HDR TONE MAPPING METHODS WITH SCENE ADAPTIVE PARAMETERIZED TONE MAP FUNCTION

(71) Applicant: Samsung Electronics Co., Ltd., Suwon-si (KR)

(72) Inventors: Li Tao, Mountain View, CA (US); Yeong-Taeg Kim, Mountain View, CA (US); Chenguang Liu, Mountain View, CA (US); Pradeep Nagesh, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,603

(22) Filed: Oct. 27, 2021

(65) Prior Publication Data

US 2022/0051377 A1 Feb. 17, 2022

Related U.S. Application Data

(63) Continuation of application No. 14/986,563, filed on Dec. 31, 2015, now Pat. No. 11,176,646.

(Continued)

(51) Int. Cl.
*G06T 5/00* (2006.01)
*H04N 19/00* (2014.01)

(52) U.S. Cl.
CPC .............. *G06T 5/009* (2013.01); *H04N 19/00* (2013.01); *G06T 2207/20208* (2013.01)

(58) Field of Classification Search
CPC .. H04N 5/00; H04N 7/00; H04N 9/00; H04N 19/00; G06K 9/00; G06T 5/00
See application file for complete search history.

(56) References Cited

U.S. PATENT DOCUMENTS

| 5,363,477 A | 11/1994 | Kuragano et al. |
| 2004/0201610 A1* | 10/2004 | Rosen ................... G06F 40/117 715/202 |

(Continued)

OTHER PUBLICATIONS

Julian Faraway, Modelling three-dimensional trajectories by using Bezier curves with application to hand motion, Apr. 2007, University of Bath, UK, Part 5, pp. 571-585 (Year: 2007).*

(Continued)

*Primary Examiner* — Maryam A Nasri (57) ABSTRACT

A method, apparatus, and non-transitory computer readable medium for video tone mapping. The method includes a target display receiving a quantized video generated by a master display, the quantized video being mastered for a first range of luminance values associated with the master display; receiving metadata from a tone mapping curve parameter extraction, the metadata comprising at least one maximum value of a luminance parameter of the quantized video as mastered for the first range of luminance values; and de-quantizing the quantized video to produce a de-quantized video. The method also includes at least one processor of the target display applying a tone mapping function defined by a normalized Bezier curve to the de-quantized video; and generating, based on applying the tone mapping function, a tone mapped video mastered for a second range of luminance values associated with the target display.

20 Claims, 8 Drawing Sheets

Related U.S. Application Data (60) Provisional application No. 62/184,667, filed on Jun. 25, 2015.

(56) References Cited

U.S. PATENT DOCUMENTS

| | | | |
|---|---|---|---|
| 2011/0050934 A1* | 3/2011 | Mitsunaga | H04N 1/6027 348/222.1 |
| 2012/0147953 A1* | 6/2012 | El-Mahdy | H04N 19/44 375/240.03 |
| 2016/0189409 A1* | 6/2016 | Aiba | G09G 5/377 345/629 |
| 2016/0366386 A1 | 12/2016 | Douady-Pleven et al. | |

OTHER PUBLICATIONS

Faraway Julian J., "Modelling three-dimensional trajectories by using Bézier curves with application to hand motion", Appl. Statist., Apr. 2007, pp. 571-585, 56, Part 5, 0035-9254/07/56571, Royal Statistical Society, Bath, UK.

\* cited by examiner

HDR TONE MAPPING METHODS WITH SCENE ADAPTIVE PARAMETERIZED TONE MAP FUNCTION

CROSS-REFERENCE TO RELATED APPLICATION(S) AND CLAIM OF PRIORITY

This application claims priority under 35 U.S.C. § 120 as a continuation of U.S. patent application Ser. No. 14/986,563 filed on Dec. 31, 2015, which claims priority under 35 U.S.C. § 119(e) to U.S. Provisional Patent Application No. 62/184,667 filed on Jun. 25, 2015, entitled "HDR Tone Mapping Methods with Parameterized Tone Map Function." The above-identified patent applications are hereby incorporated by reference in their entirety.

TECHNICAL FIELD

This disclosure relates generally to video tone processing. More specifically, this disclosure relates to high dynamic range (HDR) tone mapping methods with parameterized tone map function.

BACKGROUND

At a studio, users can produce mastered videos using a mastering monitor to optimize or improve the luminance or brightness levels of the original videos. Often times, the mastering monitor used to master the video has different peak luminance or brightness levels than those of target displays upon which the videos are later displayed. Typically, the maximum luminance level of the mastering monitor is much larger than the maximum luminance level of the target display.

SUMMARY

This disclosure provides HDR tone mapping methods with parameterized tone map function.

In one embodiment, a computer-implemented method is provided. The method includes receiving, by a target display, a quantized video generated by a master display, the quantized video being mastered for a first range of luminance values associated with the master display. The method also includes receiving, by the target display, metadata from a tone mapping curve parameter extraction, the metadata comprising at least one maximum value of a luminance parameter of the quantized video as mastered for the first range of luminance values. The method also includes de-quantizing the quantized video to produce a de-quantized video. The method also includes applying, by at least one processor of the target display, a tone mapping function defined by a normalized Bezier curve to the de-quantized video. The method further includes generating, based on applying the tone mapping function by the at least one processor of the target display, a tone mapped video mastered for a second range of luminance values associated with the target display.

In another embodiment an apparatus is provided. The apparatus includes a display, a memory, and at least one processor operably connected to the memory. The at least one processor is configured to: receive a quantized video generated by a master display, the quantized video being mastered for a first range of luminance values associated with the master display; receive metadata from a tone mapping curve parameter extraction, the metadata comprising at least one maximum value of a luminance parameter of the quantized video as mastered for the first range of luminance values; de-quantize the quantized video to produce a de-quantized video; apply a tone mapping function defined by a normalized Bezier curve to the de-quantized video; and generate a tone mapped video mastered for a second range of luminance values associated with the display.

In yet another embodiment, a non-transitory computer readable medium comprising program code is provided. The program code, when executed by at least one processor, causes the at least one processor to: receive a quantized video generated by a master display, the quantized video being mastered for a first range of luminance values associated with the master display; receive metadata from a tone mapping curve parameter extraction, the metadata comprising at least one maximum value of a luminance parameter of the quantized video as mastered for the first range of luminance values; de-quantize the quantized video to produce a de-quantized video; apply a tone mapping function defined by a normalized Bezier curve to the de-quantized video; and generate a tone mapped video mastered for a second range of luminance values associated with a display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of the present disclosure recognize that displaying the mastered video at on a display with a maximum luminance level that is lower than the maximum luminance level in the mastered video can reduce the quality of the video. For example, portions of the mastered video with luminance levels greater than the maximum luminance level of the target display may be clipped or limited to the maximum luminance level of the target display, thereby limiting the range of luminance values of the video displayed.

Accordingly, various embodiments of the present disclosure produce a tone mapped video using HDR tone mapping methods with scene adaptive parameterized tone map function. In one or more embodiments, the adaptive tone mapping based on local contrast may reduce costs while providing improved video quality regarding saturation of highlighted objects or scenes.

One or more embodiments relate to data for rendering images on a display device. In one embodiment, a method comprises one or more applications of tone mapping of images, graphics, and/or video (collectively referred to simply as "video" herein) to facilitate remastering content and/or to facilitate high dynamic range (HDR) displays. For example, one or more embodiments are described herein that can facilitate tone mapping for HDR displays using parameterized tone map functions. It will be appreciated that the various embodiments disclosed herein can be used either alone or in combination.

Taking an example where a studio already mastered a movie with a mastering monitor having maximum luminance level of M-nit, a user may want the mastered video to have a different peak luminance level of N-nit for a target display where N<M. In such case, the user may need to re-master the original video file using a mastering monitor having a maximum luminance level of N-nit. Embodiments of the present disclosure recognize that this process can be time intensive and costly. In another example, the user may use a tone mapping method using already mastered video to generate a tone mapped video with algorithms or software that down tone maps from the higher mastering monitor luminance level to the lower target display luminance level. Embodiments of the present disclosure recognize that this process can produce unsatisfactory results, such as, saturation of highlighted objects or scenes.

Figure 1:
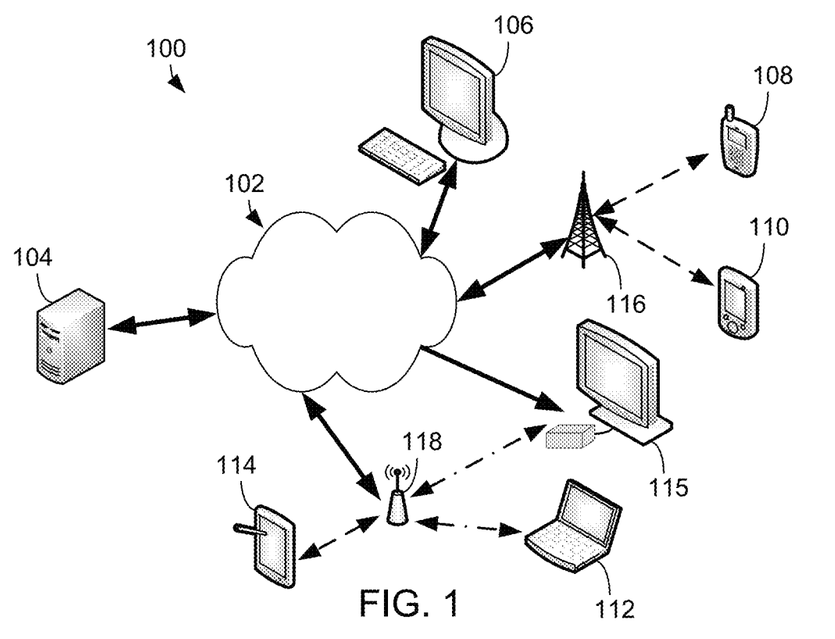
FIG. 1 illustrates an example computing system in which various embodiments of the present disclosure may be implemented.

FIG. 1 illustrates an example computing system 100 in which various embodiments of the present disclosure may be implemented. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100 on one or more communication channels. The network 102 may communicate Internet Protocol (IP) packets, frame relay frames, or other information between network addresses. The network 102 may include one or more local area networks (LANs): metropolitan area networks (MANs); wide area networks (WANs); all or a portion of a global network, such as the Internet; or any other communication system or systems at one or more locations.

In various embodiments, network 102 includes a broadcast and broadband networks and communication channels for communicating video data (e.g., video files including metadata and audio content) to client devices 106-115. The broadcasting elements of network 102, such as cable and satellite communication links, provide broadcast of video data to client devices 106-115. The broadband elements of network 102, Internet, wireless, wireline, and fiber optic network links and devices, provide for streaming and download of video data.

The network 102 facilitates communications between one or more servers 104 and various client devices 106-115. Each of the servers 104 includes any suitable computing or processing device that can provide computing services for one or more client devices. Each of the servers 104 could, for example, include one or more processing devices, one or more memories storing instructions and data, and one or more network interfaces facilitating communication over the network 102. For example, one or more of the servers 104 may include processing circuitry for mastering a video or for tone mapping a video based on local contrast, as discussed in greater detail below.

Each client device 106-115 represents any suitable computing or processing device that interacts with at least one server or other computing device(s) over the network 102. As will be discussed in greater detail below, the client devices 106-115 receive video (e.g., a mastered video file to be tone mapped or a tone mapped video file to be displayed) and may include processing circuitry for tone mapping a video based on local contrast. The client devices 106-115 each either includes or is connected to a display device for display of tone mapped video. In this example, the client devices 106-115 include a computer 106, a mobile telephone or smartphone 108, a personal digital assistant (PDA) 110, a laptop computer 112, tablet computer 114; and a set-top box and/or television 115. However, any other or additional client devices could be used in the communication system 100. In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Each client device 112-115 can also receive or be used to create control points for a Bezier curve function. Note that these are for illustration only and that each client device could communicate directly with the network 102 or indirectly with the network 102 via any suitable intermediate device(s) or network(s).

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
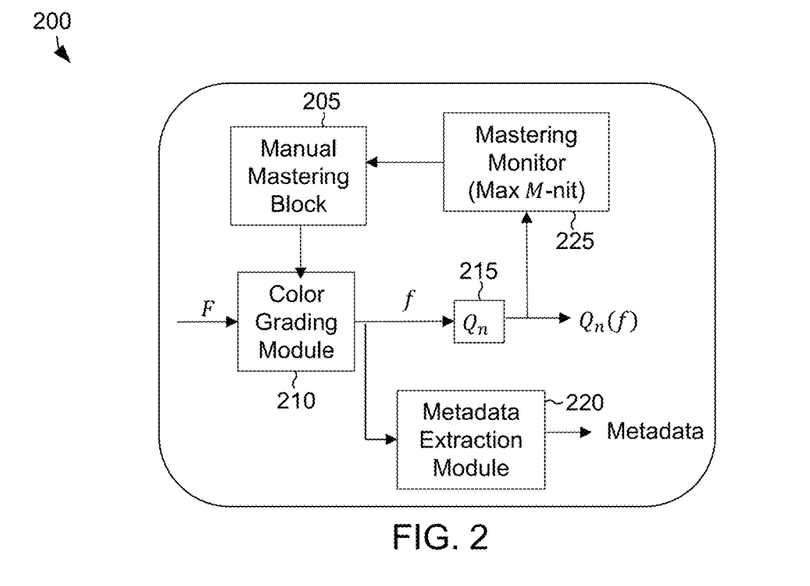
FIG. 2 illustrates a block diagram for generating a mastered video that can be remastered according to various embodiments of the present disclosure.

FIG. 2 illustrates a system 200 for generating a mastered video HDR tone mapping methods with a scene adaptive parameterized tone map function according to embodiments of the present disclosure. The embodiment of the mastered video generating system 200 shown in FIG. 2 is for illustration only. Other embodiments could be used without departing from the scope of the present disclosure.

During manual mastering block 205, an input master video file F may be graded using a color grading module 210. As outputs, the color grading module 210 provides a mastered video file $f_M$, which is fed as an input to a quantizer $Q_n$ 215 and a metadata extraction module 220. The quantizer $Q_n$ 215 quantizes the mastered video file $f_M$ to produce an n-bit quantized mastered video file $Q_n(f_M)$. The associated maximum luminance level of the video file f is $L_{max}$ nit. The quantizer $Q_n$ 215 quantizes f into $2^n$ levels (i.e., n-bit long binary code) with a pre-determined quantization curve.

The metadata extraction module 220 generates metadata about the mastered video file, for example, maximum luminance level of the mastering monitor 225 (M), maximum content luminance level (MaxCLL) or brightness, MaxFALL, or other properties about the mastered video file. The files $f_M$ and $Q_n(f_M)$ as well as the metadata associated with the mastered video file are be stored in a storage device (e.g., such as storage device 915 in FIG. 9 discussed below) for transfer to and later display by a target display device (e.g., one of client devices 106-115).

A mastering monitor 225 de-quantizes the quantized mastered video file for display of the video on the mastering monitor 225. The de-quantization $Q_n$ is the inverse operation of the quantization operation of the quantizer $Q_n$ 215. By displaying the mastered video, the mastering monitor 225 provides visual feedback for continued or iterative adjustment of color tones for the manual mastering block 205. However, the mastering monitor 225 may have very high contrast (e.g., has a maximum luminance level of M) in comparison with contrast available on a target display device (e.g., consumer-grade television sets, projectors, mobile phones, etc.) (e.g., having a maximum luminance level of N where M>N). As a result, the mastered video displayed on the mastering monitor 225 may look different than displayed on a target display device. For example, because the mastering monitor 225 can display brighter images than a typical home television set, the bright portions of the mastered video displayed on the home television set may clip and, thus, image details may be lost. For example, portions of in the mastered video having luminance levels above the maximum luminance level of the target display may all be displayed at the same luminance level (i.e., at the maximum luminance level of the target display).

Figure 3:
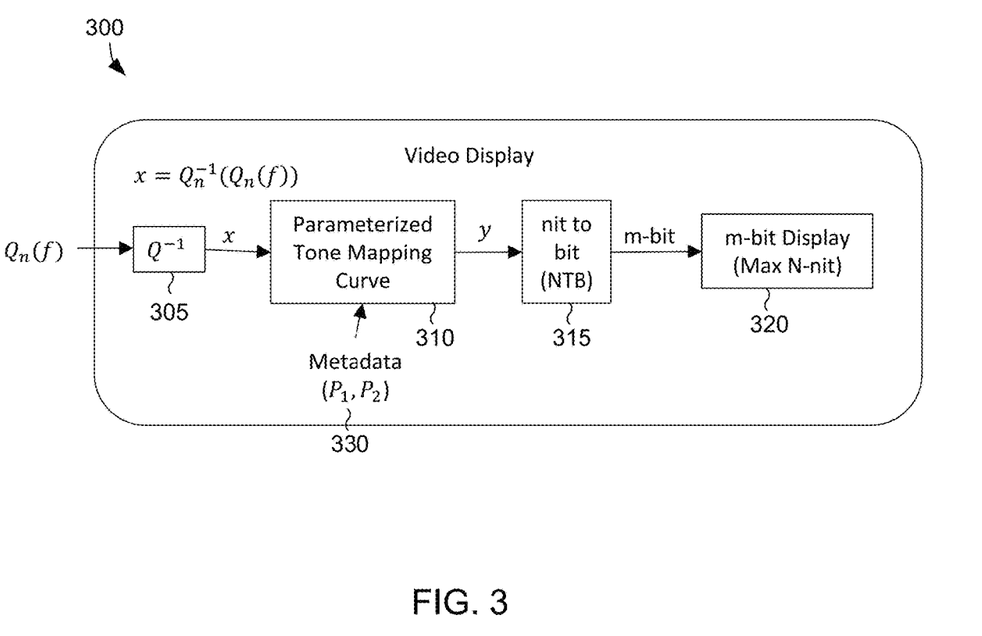
FIG. 3 illustrates a block diagram for a video display according to various embodiments of the present disclosure.

FIG. 3 illustrates an block diagram for a video display 300 according to various embodiments of the present disclosure. The embodiment of the video display 300 shown in FIG. 3 is for illustration only. Other embodiments could be used without departing from the scope of the present disclosure.

The example video display 300 includes a de-quantizer 305, a parameterized tone mapping function 310, a nit-to-bit function 315, and an m-bit display 320. The mastered video is received by the video display 300 and can be received with or separately from the metadata 330. The mastered video is processed in the de-quantizer. The de-quantizer 415 de-quantizes an n-bit quantized mastered video file to produce the mastered video file.

Using the received metadata 330, the parameterized tone mapping function 310 processes the mastered video. In certain embodiments, a Bezier curve function is used to process the mastered video. When a Bezier curve is used, control points are identified in the metadata. An amount of control points identified determines the order of the Bezier curve function. The nit-to-bit function 315 decodes the mastered video. The video is then rendered for an m-bit display 320.

Figure 4:
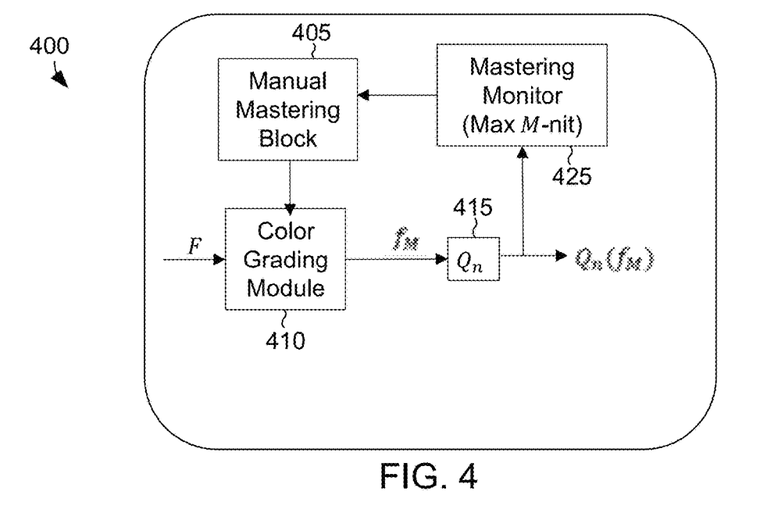
FIG. 4 illustrates a block diagram for generating a mastered video that can be remastered according to various embodiments of the present disclosure.

FIG. 4 illustrates a block diagram for generating a mastered video that can be remastered according to various embodiments of the present disclosure. The embodiment of the mastered video generating system 400 shown in FIG. 4 is for illustration only. Other embodiments could be used without departing from the scope of the present disclosure.

During manual mastering block 405, an input master video file F may be graded using a color grading module 410. As outputs, the color grading module 410 provides a mastered video file $f_M$, which is fed as an input to a quantizer $Q_n$ 415. The quantizer $Q_n$ 415 quantizes the mastered video file $f_M$ to produce an n-bit quantized mastered video file $Q_n(f_M)$. The associated maximum luminance level of the video file f is $L_n$ax nit. The quantizer $Q_n$ 415 quantizes f into $4^n$ levels (i.e., n-bit long binary code) with a pre-determined quantization curve.

A mastering monitor 425 de-quantizes the quantized mastered video file for display of the video on the mastering monitor 425. The de-quantization $Q_n$ is the inverse operation of the quantization operation of the quantizer $Q_n$ 415. By displaying the mastered video, the mastering monitor 425 provides visual feedback for continued or iterative adjustment of color tones for the manual mastering block 405. However, the mastering monitor 425 may have very high contrast (e.g., has a maximum luminance level of M) in comparison with contrast available on a target display device (e.g., consumer-grade television sets, projectors, mobile phones, etc.) (e.g., having a maximum luminance level of N where M>N). As a result, the mastered video displayed on the mastering monitor 425 may look different than displayed on a target display device. For example, because the mastering monitor 425 can display brighter images than a typical home television set, the bright portions of the mastered video displayed on the home television set may clip and, thus, image details may be lost. For example, portions of in the mastered video having luminance levels above the maximum luminance level of the target display may all be displayed at the same luminance level (i.e., at the maximum luminance level of the target display).

Figure 5:
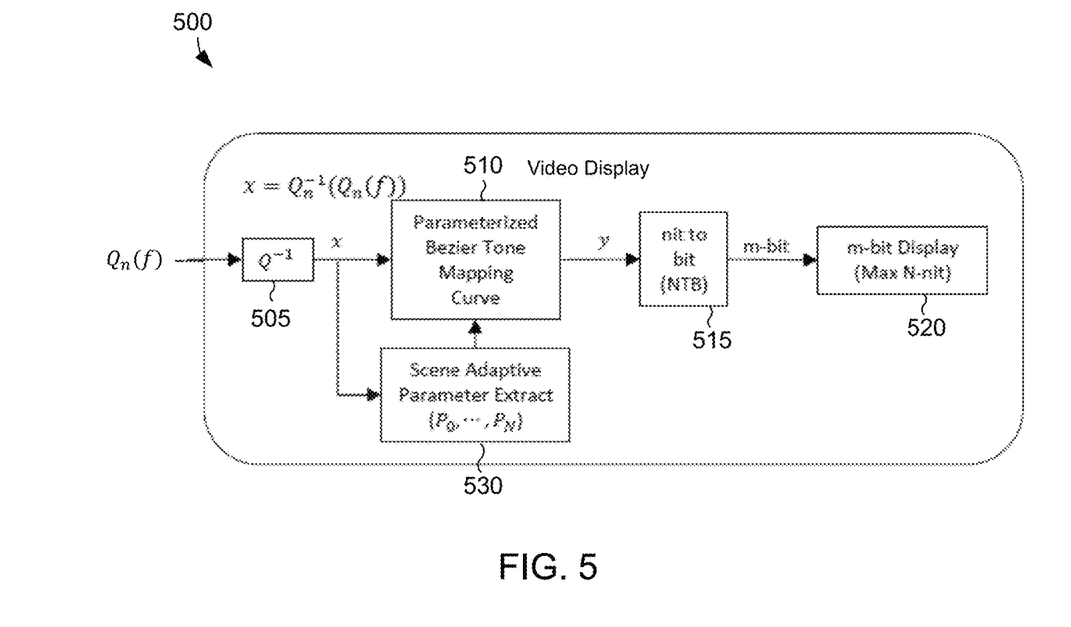
FIG. 5 illustrates a block diagram for a video display according to various embodiments of the present disclosure.

FIG. 5 illustrates a block diagram for a video display 500 according to various embodiments of the present disclosure. The embodiment of the video display 500 shown in FIG. 5 is for illustration only. Other embodiments could be used without departing from the scope of the present disclosure.

The example video display 500 includes a de-quantizer 505, a parameterized tone mapping function 510, a nit-to-bit function 515, and an m-bit display 520. The mastered video is received by the video display 500. The mastered video is processed in the de-quantizer. The de-quantizer 415 de-quantizes an n-bit quantized mastered video file to produce the mastered video file.

The scene adaptive parameter extract function 530 generates metadata about the mastered video file, for example, maximum luminance level of a mastering monitor (M), maximum content luminance level (MaxCLL) or brightness, MaxFALL, or other properties about the mastered video file. The scene adaptive parameter extract function 530 determines the control points of a video for processing. The scene adaptive parameter extract function is described in greater detail along with FIG. 9.

Using the control parameters from the scene adaptive parameter extraction function 530, the parameterized tone mapping function 510 processes the mastered video. In certain embodiments, a Bezier curve function is used to process the mastered video. An amount of control points identified determines the order of the Bezier curve function. The nit-to-bit function 515 decodes the mastered video. The video is then rendered for an m-bit display 520.

Figure 6A:
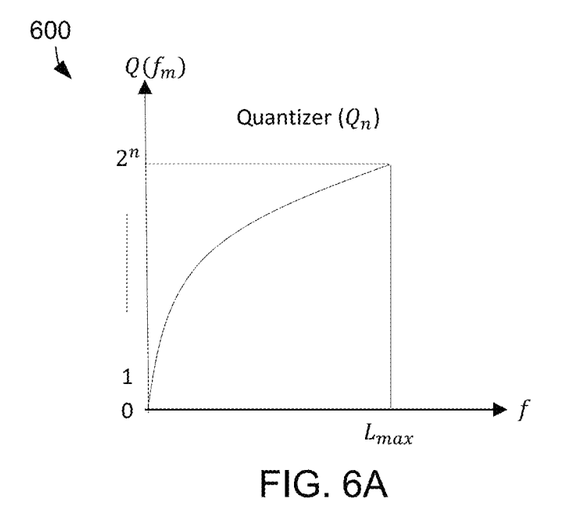
FIG. 6A illustrates an example graph for analyzing a video using a quantizer according to various embodiments of the present disclosure.
Figure 6B:
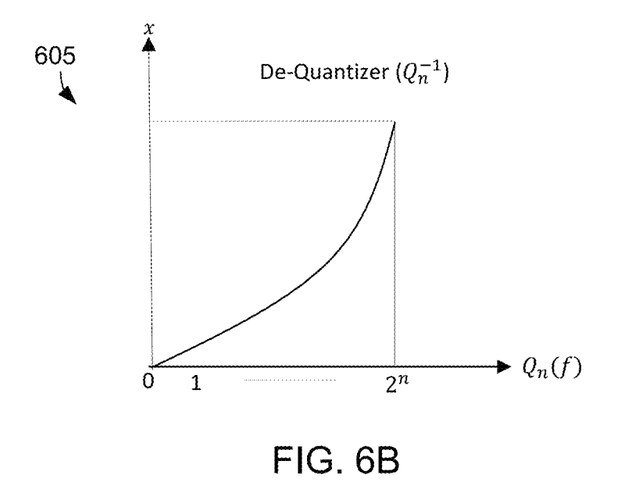
FIG. 6B illustrates an example graph for analyzing a video using a de-quantizer according to various embodiments of the present disclosure.

FIG. 6A illustrates an example graph 600 for analyzing a video using a quantizer according to various embodiments of the present disclosure. FIG. 6B illustrates an example graph 605 for analyzing a video using a de-quantizer according to various embodiments of the present disclosure.

The quantizer graph 600 can be used by the quantizer 215 or 415. The associate maximum luminance level off is $L_{max}$ nit. $Q_n$ quantifies f into $2^n$ levels (n-bit long binary code) with a pre-determine quantization curve.

The de-quantizer graph 605 can be used by the de-quantizer 305 or 505. The de-quantizer graph 605 is an inverse operation of $Q_n$. In ideal cases ($L_{max}$ is a floating point), $x=Q_n-1(Q_n(f))=f$. But practically, there is a quantization error $|x-f|$ if $L_{max}$ is an integer, as a function of n.

Figure 7A:
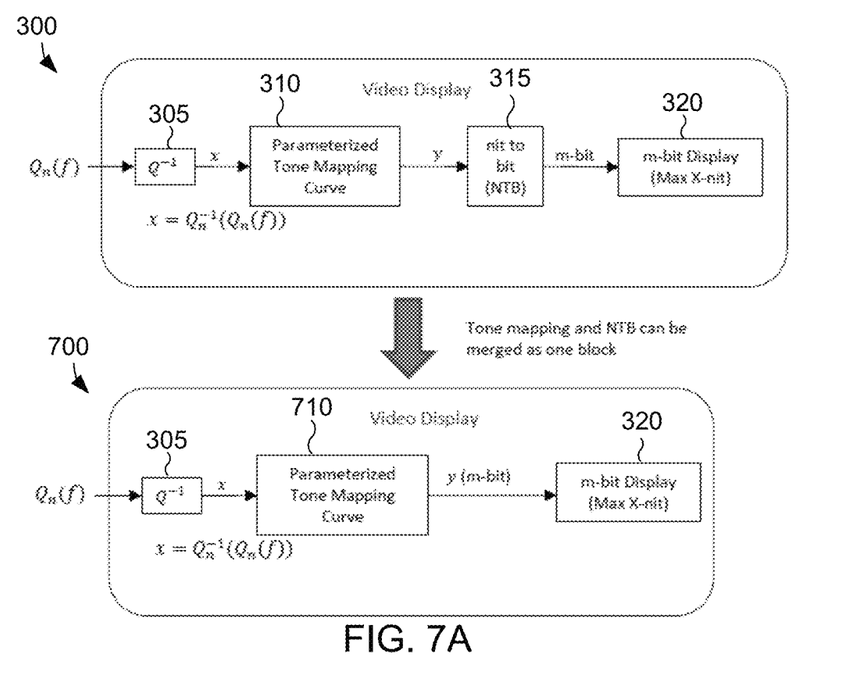
FIGS. 7A and 7B illustrate example display-side tone mapping according to the various embodiments of the present disclosure.
Figure 7B:
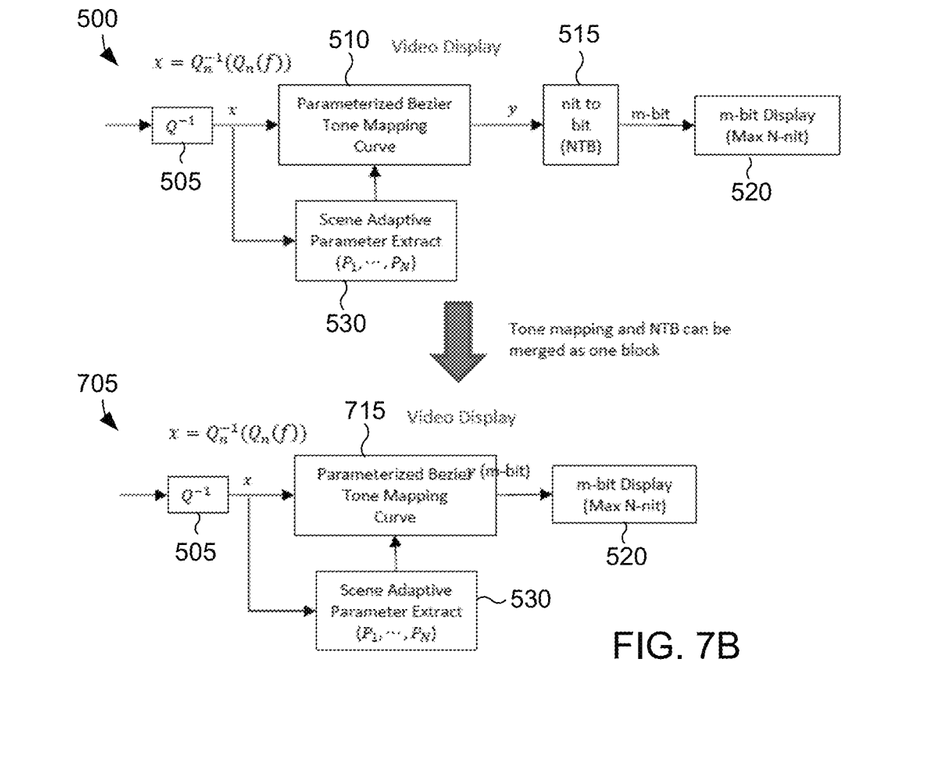

FIGS. 7A and 7B illustrate example display-side tone mapping according to the various embodiments of the present disclosure. FIG. 7A illustrates a video display similar to the video display 300 in FIG. 3. FIG. 7B illustrates a video display similar to the video display 500 in FIG. 5. In FIG. 7A the display 700 combines the parameterized tone mapping curve function 310 and the nit-to-bit function 315 into a combined tone mapping function 710. In FIG. 7B the display 705 combines the parameterized tone mapping curve function 510 and the nit-to-bit function 515 into a combined tone mapping function 715. The combined tone mapping functions 710 and 715.

Figure 8:
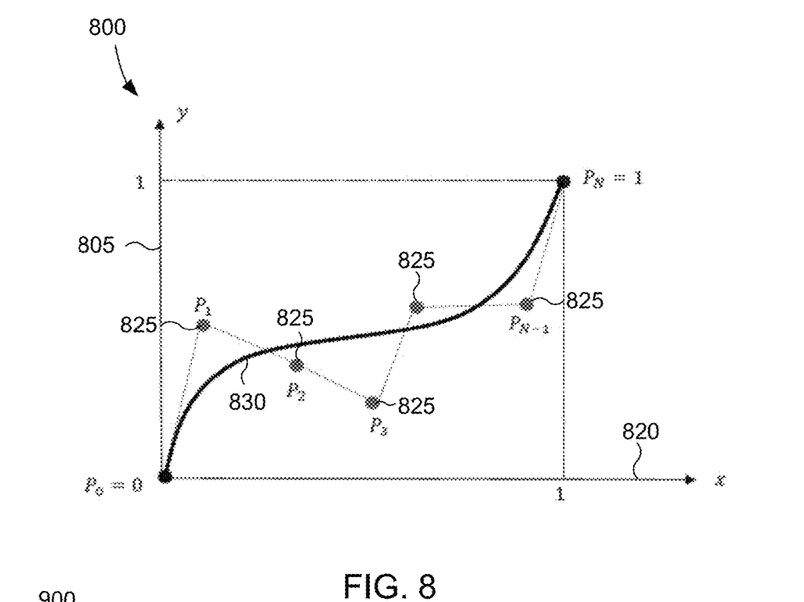
FIG. 8 illustrates an example parameterized tone mapping curve according to various embodiments of the present disclosure.

FIG. 8 illustrates an example parameterized tone mapping curve 800 according to various embodiments of the present disclosure. FIG. 8 illustrates an example N-th order explicit Bezier curve 830 according to various embodiments of the present disclosure. In certain embodiments, an N-th order Bezier curve 830 is used for the parameterized tone mapping functions 310, 510, 710 and 715. In certain embodiments, an N-th order explicit Bezier tone mapping curve 830 can be determine using equation 1:

$$y = \sum_{k=0}^{N}\binom{N}{k}x^k(1-x)^{N-k}P_k,$$

where $$\binom{N}{k} = \frac{N!}{k!(N-k)!}, 0 \le x, y \le 1,$$

and where
P={$P_0, P_1, \ldots, P_N$} are control points ($0 \le P_i \le 1$, $P_0=0$, $P_N=1$). where N is the order of the Bezier function, x is an input value (e.g., normalized luminance value) for a pixel, P is a control point, and y is the output value (e.g., normalized luminance value) for the pixel.

Figure 9:
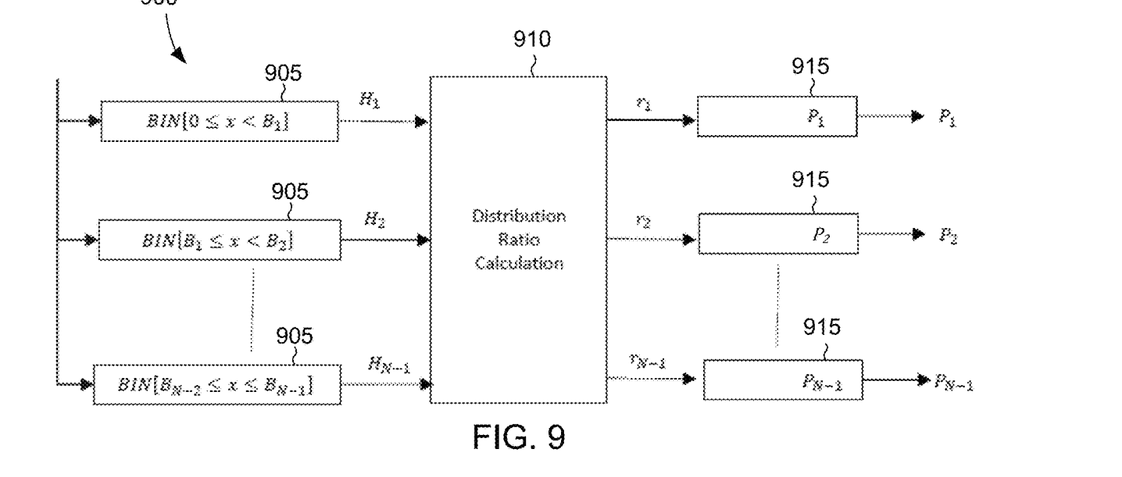
FIG. 9 illustrates a scene adaptive parameter extraction function according to the various embodiments of the present disclosure.

FIG. 9 illustrates a scene adaptive parameter extraction function 900 according to the various embodiments of the present disclosure. The embodiment of the scene adaptive parameter extraction function 900 shown in FIG. 9 is for illustration only. Other embodiments could be used without departing from the scope of the present disclosure.

The scene adaptive parameter extraction function 900 receives the mastered video file and distributes the video into bins 905 based on the luminance values of the one or more frames. The bins 905 are processed through a distribution ratio calculation function 910 to determine a computed distribution of the luminance values, $r_i$. In certain embodiments, the $r_i$ can be calculated using the equation:

$$r_i = \frac{H_i}{\sum_{k=1}^{N-1} H_k}$$

where $r_i$ is the computed distribution of luminance value and $H_i$ is the plurality of bins. The computed distribution of luminance values is used to calculate the control points for the Bezier function.

Figure 10A:
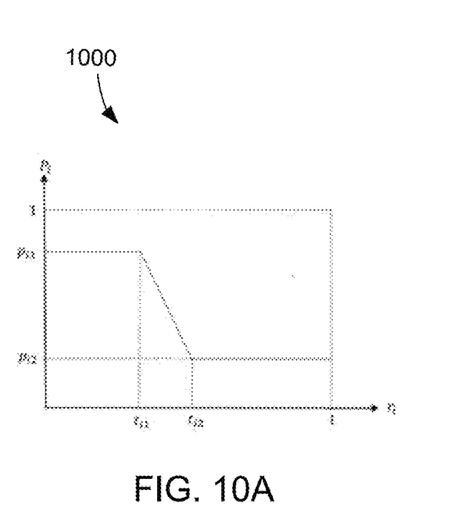
FIGS. 10A and 10B illustrate a function for calculating a control point from a distribution ratio according to the various embodiments of the present disclosure.
Figure 10B:
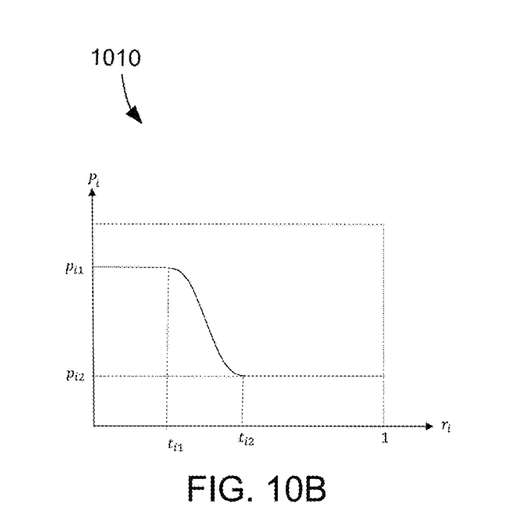

FIGS. 10A and 10B illustrate functions 1000 and 1010 for calculating a control point from a distribution ratio according to the various embodiments of the present disclosure. The embodiment of the function 1000 and 1010 shown in FIGS. 10A and 10B are for illustration only. Other embodiments could be used without departing from the scope of the present disclosure. Functions 1000 and 1010 are used to determine the control points, $P_i$, from the computed distribution of luminance value, $r_i$. The functions are for illustration only and any function could be used.

Figure 11:
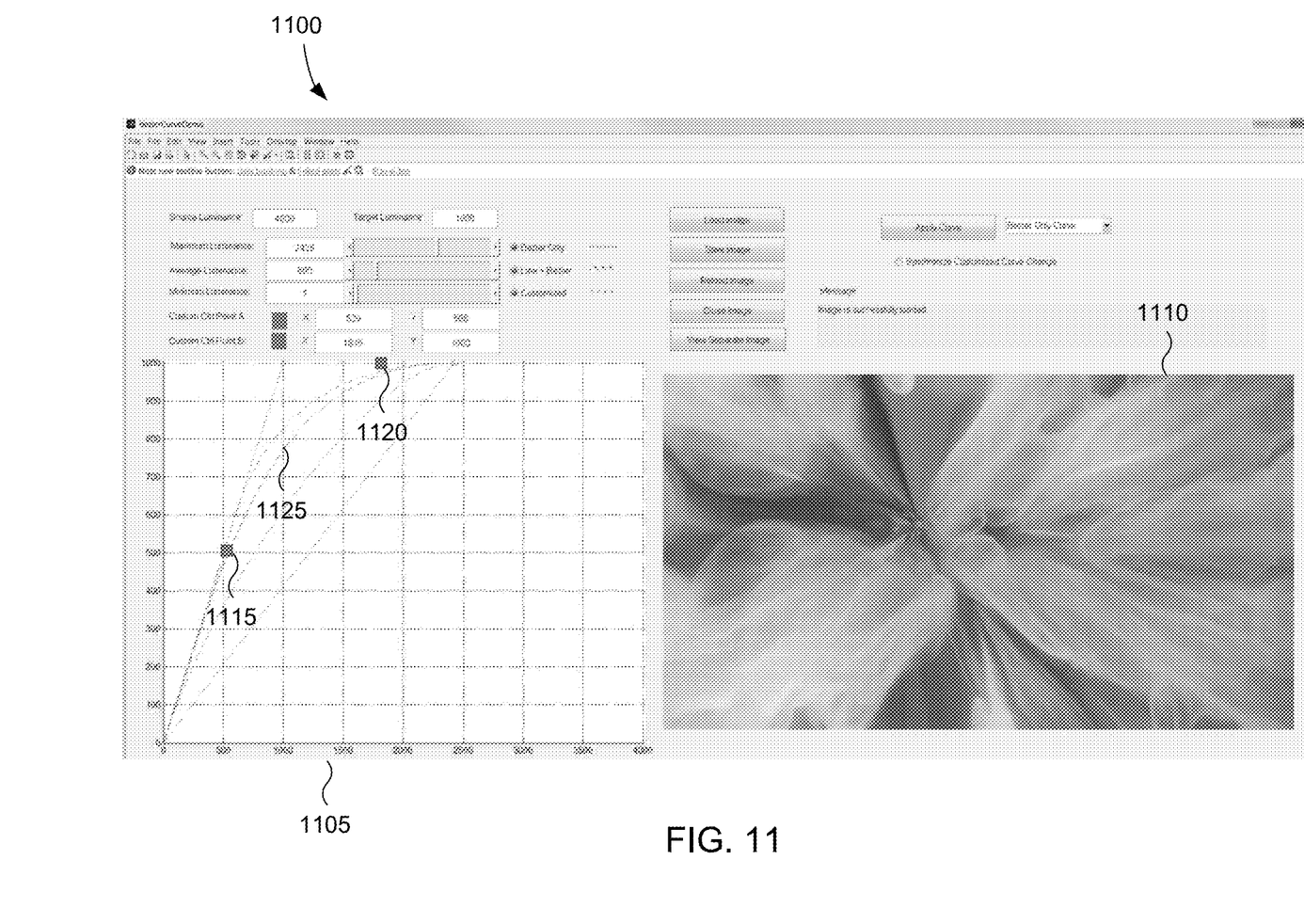
FIG. 11 illustrates an example user interface for tone mapping curve parameter extraction according to the various embodiments of the present disclosure.

FIG. 11 illustrates an example user interface 1100 for tone mapping curve parameter extraction according to the various embodiments of the present disclosure. The embodiment of the user interface 1100 shown in FIG. 11 is for illustration only. Other embodiments could be used without departing from the scope of the present disclosure. The user interface 1100 includes a control panel 1105 and a video panel 1110. The user interface 1100 shown below can be provided as a utility of the color grading module 210 of FIG. 2 or 410 of FIG. 4 for adjusting the tone map of the video. In certain embodiments, the effects of the selected tone mapping can be seen on the mastering monitor 205 and 405. The user interface 1100 allows the user to select the control points P1 and P2 (labeled as control points A 1115 and B 1120) as well other parameters.

After an image is loaded to the video panel 1110, control points A 1115 and B 1120 are automatically computed by image characteristics and display on the control panel 1105. Control points A 1115 and B 1120 can be manually adjusted by different user input methods, for example a mouse or touch screen. As the control points 1115 and 1120 are adjusted in the control panel 1105, the customized curve 1125 and the image in the video panel 1110 automatically adjust. The suitable curve can be selected and control points 1115 and 1120 are extracted.

Figure 12:
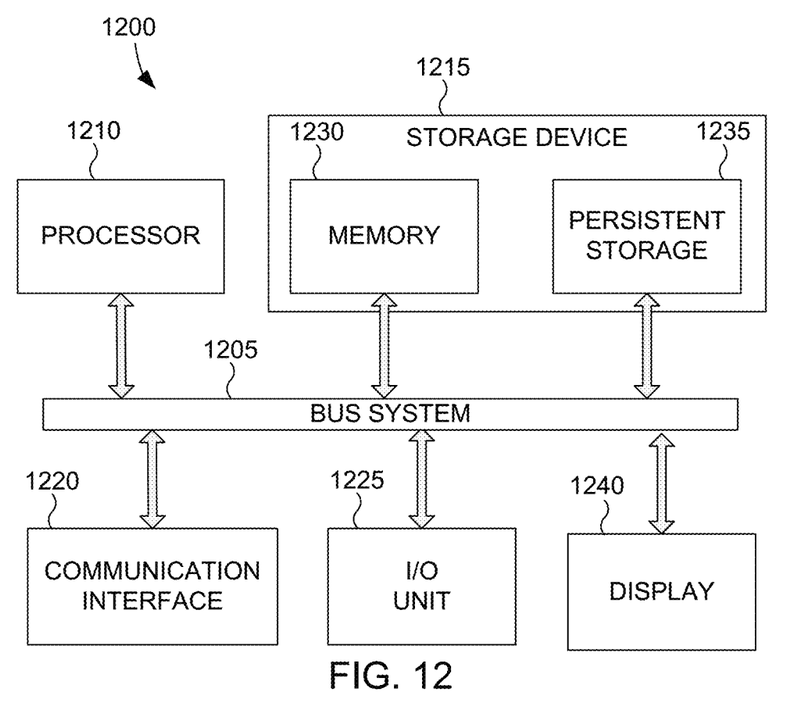
FIG. 12 illustrates an example video processing device according to various embodiments of the present disclosure.

FIG. 12 illustrates an example video processing device 1200 according to this disclosure. In particular, the video processing device 1200 illustrates example components that may be included in any one of the server 104 or the client devices 106-115 in FIG. 1 to implement one or more embodiments of the present disclosure.

As shown in FIG. 12, the video processing device 1200 includes a bus system 1205, which supports communication between at least one processor 1210, at least one storage device 1215, at least one communication interface 1220, at least one input/output (I/O) unit 1225, and a display 1240.

The processor 1210 executes instructions that may be loaded into a memory 1230. The processor 1210 may include any suitable number(s) and type(s) of processors or other devices in any suitable arrangement. Example types of processor 1210 include microprocessors, microcontrollers, digital signal processors, field programmable gate arrays, application specific integrated circuits, and discreet circuitry. For example, the processor 1210 may implement tone mapping operations performed by any of the processes and systems 300-1100 being implemented in hardware or by executing stored instructions that causes the processor 1210 to perform the disclosed methods.

The memory 1230 and a persistent storage 1235 are examples of storage devices 1215, which represent any structure(s) capable of storing and facilitating retrieval of information (such as video data, program code, and/or other suitable information on a temporary or permanent basis). The memory 1230 may represent a random access memory or any other suitable volatile or non-volatile storage device(s). For example, the memory 1230 may contain instructions for implementing tone mapping techniques and/or may store streamed or buffered video data received from a server 104. The persistent storage 1235 may contain one or more components or devices supporting longer-term storage of data, such as a read-only memory, hard drive, Flash memory, or optical disc. For example, the persistent storage 1235 may contain video data such as a mastered video file and metadata associated with the mastered video file.

The communication interface 1220 supports communications with other systems or devices. For example, the communication interface 1220 could include a network interface card, a cable modem, a broadcast receiver, or a wireless transceiver facilitating communications over the network 102. The communication interface 1220 may support communications through any suitable physical or wireless communication link(s).

The I/O unit 1225 allows for input and output of data. For example, the I/O unit 1225 may provide a connection for user input through a keyboard, mouse, keypad, touchscreen, or other suitable input device. The I/O unit 1225 may also send output to the display 1240, printer, or other suitable output device.

The video processing device 1200 further includes or is connected to a display 1240, such as, for example, the target displays 345, 365, 510, 720, and 825. In one example embodiment, the video processing device 1200 may be video processing circuitry included in a set top box, cable box, computer, etc. connected to the display 1240 for tone mapped video to be displayed. In another example embodiment, the video processing device 1200 may be the set top box, cable box, computer, media player, etc. connected to the display 1240 for tone mapped video to be displayed. In yet another example embodiment, the video processing device 1200 may be a server connected to the target display 1240 over a network connection. In another example embodiment, the video processing device 1200 may include the display 1240 that the tone mapped video to be displayed on as well as the video processing circuitry for performing the tone mapping. For example, the video processing device 1200 may be a television, monitor, mobile phone, laptop computer, tablet computer, etc.

Figure 13:
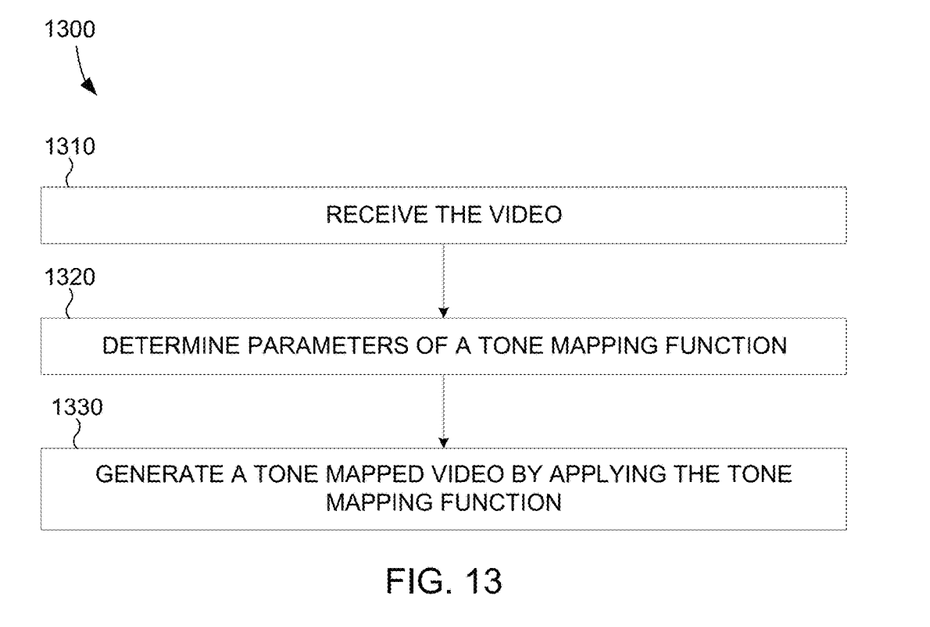
FIG. 13 illustrates an example process for video tone mapping according to various embodiments of the present disclosure.

FIG. 13 illustrates an example process 1300 for video tone mapping in accordance with various embodiments of the present disclosure. For example, the process 1300 may be performed by the server 104 or the client devices 106-115 in FIG. 1. In particular, the process 1300 can be implemented by any one of the systems 300-500 and 700-705 in FIG. 3-5 or 7 discussed above, referred to collectively here as "the system." The embodiment of the process 1300 shown in FIG. 13 is for illustration only. Other embodiments could be used without departing from the scope of the present disclosure. While particular blocks of the process 1300 are described below as being performed by specific blocks of one of the systems 300-500 and 700-705, it will be understood that any suitable block can perform each of the blocks of the process 1300 in alternative example embodiments.

In block 1310, the system receives the video for processing. For example, the video may be a mastered video file from a mastered video generating system 400. The mastered video file can be color graded in a color grading module 410 and quantized by a quantizer 415. The mastered video file can be tone mapped on a mastering monitor 425 with a high nit value, such as 4k nit.

In block 1320, the system determines the parameters of a tone mapping function. For example, block 1320 may be implemented by scene adaptive parameter extract function 530 in FIG. 5. In certain embodiments, the parameters are determined using scene adaptive processing of one or more frames, such as a scene adaptive parameter extraction function 900. The scene adaptive processing includes the system determining a distribution of luminance values of the one or more frames based on a plurality of bins, where each of the bins corresponds to a range of luminance values, and determining control points of the Bezier curve, such as Bezier curve 830, as a function of the computed distribution of luminance values as discussed above with regard to FIG. 8. For example, the computed distribution of luminance values may be determined by the equation:

$$r_i = \frac{H_i}{\sum_{k=1}^{N-1} H_k},$$

where r is the computed distribution of luminance value and H is the plurality of bins. The system identifies an amount of control points in the parameters to determine an order of the Bezier function. The determined order Bezier function is expressed by:

$$y = \sum_{k=0}^{N} \binom{N}{k} x^k (1-x)^{N-k} P_k,$$

where N is the order of the Bezier function, x is an input value for a pixel, P is a control point, and y is the output value for the pixel.

In block 1330, the system generates a tone mapped video by applying the tone mapped function. For example, the parameterized tone mapping function 510 processes the video using the Bezier curve 830. The video is processed pixel-by-pixel to determine the tone mapped nit value for the video tone mapped for the video display 500. The generated tone mapped video is then process using a nit-to-bit module 515 and rendered for the m-bit display 520.

Although FIG. 13 illustrates an example of process for video tone mapping various changes could be made to FIG. 13. For example, while shown as a series of blocks, various blocks in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A computer-implemented method comprising:
receiving, by a target display, a quantized video generated by a master display, the quantized video being mastered for a first range of luminance values associated with the master display;
receiving, by the target display, metadata from a tone mapping curve parameter extraction, the metadata comprising at least one maximum value of a luminance parameter of the quantized video as mastered for the first range of luminance values;
de-quantizing the quantized video to produce a de-quantized video;
applying, by at least one processor of the target display, a tone mapping function defined by a normalized Bezier curve to the de-quantized video;
generating, based on applying the tone mapping function by the at least one processor of the target display, a tone mapped video mastered for a second range of luminance values associated with the target display;
displaying, on the target display, a user interface configured to receive at least one of a first input for changing a parameter to adjust a customized tone mapping curve corresponding to an image of the tone mapped video or a second input for selecting coordinates to adjust a control point of the customized tone mapping curve; and
performing at least one of:
in response to receiving the first input, adjusting the customized tone mapping curve corresponding to the image based on the changed parameter indicated by the first input; or
in response to receiving the second input, adjusting the control point and the customized tone mapping curve based on the selected coordinates indicated by the second input.

2. The method of claim 1, wherein the parameter associated with the first input comprises a luminance value.

3. The method of claim 1, wherein applying the tone mapping function comprises:
determining a distribution of luminance values of one or more frames based on a plurality of bins, wherein each of the bins corresponds to a range of luminance values; and
determining control points of the normalized Bezier curve as a function of the distribution of luminance values.

4. The method of claim 3, wherein the distribution of luminance values is determined by:

$$r_i = \frac{H_i}{\sum_{k=1}^{N-1} H_k},$$

where r represents the distribution of luminance values, and H represents the plurality of bins.

5. The method of claim 1, further comprising:
identifying control points of the normalized Bezier curve in the metadata.

6. The method of claim 5, further comprising determining an order of the normalized Bezier curve based on an amount of the identified control points.

7. The method of claim 6, wherein the determined order of the normalized Bezier curve is expressed by:

$$y = \sum_{k=0}^{N} \binom{N}{k} x^k (1-x)^{N-k} P_k,$$

where N represents the order of the normalized Bezier curve, x represents an input value for a pixel, P represents a control point, and y represents an output value for the pixel.

8. An apparatus comprising:
a display;
a memory; and
at least one processor operably connected to the memory, the at least one processor configured to:
receive a quantized video generated by a master display, the quantized video being mastered for a first range of luminance values associated with the master display;
receive metadata from a tone mapping curve parameter extraction, the metadata comprising at least one maximum value of a luminance parameter of the quantized video as mastered for the first range of luminance values;
de-quantize the quantized video to produce a de-quantized video;
apply a tone mapping function defined by a normalized Bezier curve to the de-quantized video;
generate a tone mapped video mastered for a second range of luminance values associated with the display;
display, on the display, a user interface configured to receive at least one of a first input for changing a parameter to adjust a customized tone mapping curve corresponding to an image of the tone mapped video or a second input for selecting coordinates to adjust a control point of the customized tone mapping curve; and
perform at least one of:
in response to receiving the first input, adjust the customized tone mapping curve corresponding to the image based on the changed parameter indicated by the first input; or
in response to receiving the second input, adjust the control point and the customized tone mapping curve based on the selected coordinates indicated by the second input.

9. The apparatus of claim 8, wherein the parameter associated with the first input comprises a luminance value.

10. The apparatus of claim 8, wherein, to apply the tone mapping function, the at least one processor is further configured to:
determine a distribution of luminance values of one or more frames based on a plurality of bins, wherein each of the bins corresponds to a range of luminance values; and
determine control points of the normalized Bezier curve as a function of the distribution of luminance values.

11. The apparatus of claim 10, wherein the distribution of luminance values is determined by:

$$r_i = \frac{H_i}{\sum_{k=1}^{N-1} H_k},$$

where r represents the distribution of luminance values, and H represents the plurality of bins.

12. The apparatus of claim 8, wherein the at least one processor is further configured to identify control points of the normalized Bezier curve in the metadata.

13. The apparatus of claim 12, wherein the at least one processor is further configured to determine an order of the normalized Bezier curve based on an amount of the identified control points.

14. The apparatus of claim 13, wherein the determined order of the normalized Bezier curve is expressed by:

$$y = \sum_{k=0}^{N} \binom{N}{i} x^k (1-x)^{N-k} P_i,$$

where N represents the order of the normalized Bezier curve, x represents an input value for a pixel, P represents a control point, and y represents an output value for the pixel.

15. A non-transitory computer readable medium comprising program code that, when executed by at least one processor, causes the at least one processor to:
receive a quantized video generated by a master display, the quantized video being mastered for a first range of luminance values associated with the master display;
receive metadata from a tone mapping curve parameter extraction, the metadata comprising at least one maximum value of a luminance parameter of the quantized video as mastered for the first range of luminance values;
de-quantize the quantized video to produce a de-quantized video;
apply a tone mapping function defined by a normalized Bezier curve to the de-quantized video;
generate a tone mapped video mastered for a second range of luminance values associated with a target display;
display, on the target display, a user interface configured to receive at least one of a first input for changing a parameter to adjust a customized tone mapping curve corresponding to an image of the tone mapped video or a second input for selecting coordinates to adjust a control point of the customized tone mapping curve; and
perform at least one of:
in response to receiving the first input, adjust the customized tone mapping curve corresponding to the image based on the changed parameter indicated by the first input; or
in response to receiving the second input, adjust the control point and the customized tone mapping curve based on the selected coordinates indicated by the second input.

16. The non-transitory computer readable medium of claim 15, wherein the parameter associated with the first input comprises a luminance value.

17. The non-transitory computer readable medium of claim 16, wherein the program code that, when executed by the at least one processor, causes the at least one processor to apply the tone mapping function comprises:
program code that, when executed by the at least one processor, causes the at least one processor to:
determine a distribution of luminance values of one or more frames based on a plurality of bins, wherein each of the bins corresponds to a range of luminance values; and
determine control points of the normalized Bezier curve as a function of the distribution of luminance values.

18. The non-transitory computer readable medium of claim 17, wherein the distribution of luminance values is determined by:

$$r_i = \frac{H_i}{\sum_{k=1}^{N-1} H_k},$$

where r represents the distribution of luminance values, and H represents the plurality of bins.

19. The non-transitory computer readable medium of claim 15, wherein the program code when executed by the at least one processor causes the at least one processor to identify control points of the normalized Bezier curve in the metadata.

20. The non-transitory computer readable medium of claim 19, wherein the program code when executed by the at least one processor causes the at least one processor to determine an order of the normalized Bezier curve based on an amount of the identified control points.

* * * * *